(12) United States Patent
Shin et al.

(10) Patent No.: US 9,426,668 B2
(45) Date of Patent: Aug. 23, 2016

(54) METHOD AND APPARATUS FOR BEAMFORMING IN WIRELESS COMMUNICATION SYSTEM

(71) Applicant: Electronics and Telecommunications Research Institute, Daejeon (KR)

(72) Inventors: Wooram Shin, Daejeon (KR); Hyun-jae Kim, Incheon (KR); Yong Su Lee, Daejeon (KR); Anseok Lee, Daejeon (KR); Kwang Jae Lim, Daejeon (KR); DongSeung Kwon, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 85 days.

(21) Appl. No.: 14/268,456

(22) Filed: May 2, 2014

(65) Prior Publication Data
US 2015/0080004 A1    Mar. 19, 2015

(30) Foreign Application Priority Data

Sep. 13, 2013  (KR) .......................... 10-2013-0110677

(51) Int. Cl.
*H04W 16/28*    (2009.01)
*H04B 7/02*     (2006.01)
*H04B 7/06*     (2006.01)

(52) U.S. Cl.
CPC ............. *H04W 16/28* (2013.01); *H04B 7/022* (2013.01); *H04B 7/0617* (2013.01); *H04B 7/0626* (2013.01)

(58) Field of Classification Search
CPC ... H04W 16/28; H04W 72/02; H04W 24/02; H04W 24/10
See application file for complete search history.

(56) References Cited

U.S. PATENT DOCUMENTS

| | | | |
|---|---|---|---|
| 6,330,459 B1 | 12/2001 | Crichton et al. | |
| 8,284,863 B2 | 10/2012 | Hwang et al. | |
| 2010/0067601 A1* | 3/2010 | Koslov | H04W 52/282 375/267 |
| 2013/0065622 A1* | 3/2013 | Hwang | H04W 16/28 455/500 |
| 2013/0176887 A1* | 7/2013 | Seo | H04B 7/024 370/252 |
| 2013/0235742 A1* | 9/2013 | Josiam | H04W 72/046 370/252 |

FOREIGN PATENT DOCUMENTS

| | | |
|---|---|---|
| KR | 10-2008-0104999 A | 12/2008 |
| KR | 10-2009-0087907 A | 8/2009 |

* cited by examiner

*Primary Examiner* — Myron K Wyche
(74) *Attorney, Agent, or Firm* — Rabin & Berdo, P.C.

(57) ABSTRACT

A beamforming apparatus and method for expanding coverage of a control channel are provided, by which neighboring communication devices are classified according to the number of beams that they can receive, and therefore the frequency or period of beam transmission is adjusted to transmit a control channel by a beamforming method. Hence, an overhead reduction and an increase in transmission rate can be achieved, and coverage holes can be prevented.

16 Claims, 6 Drawing Sheets

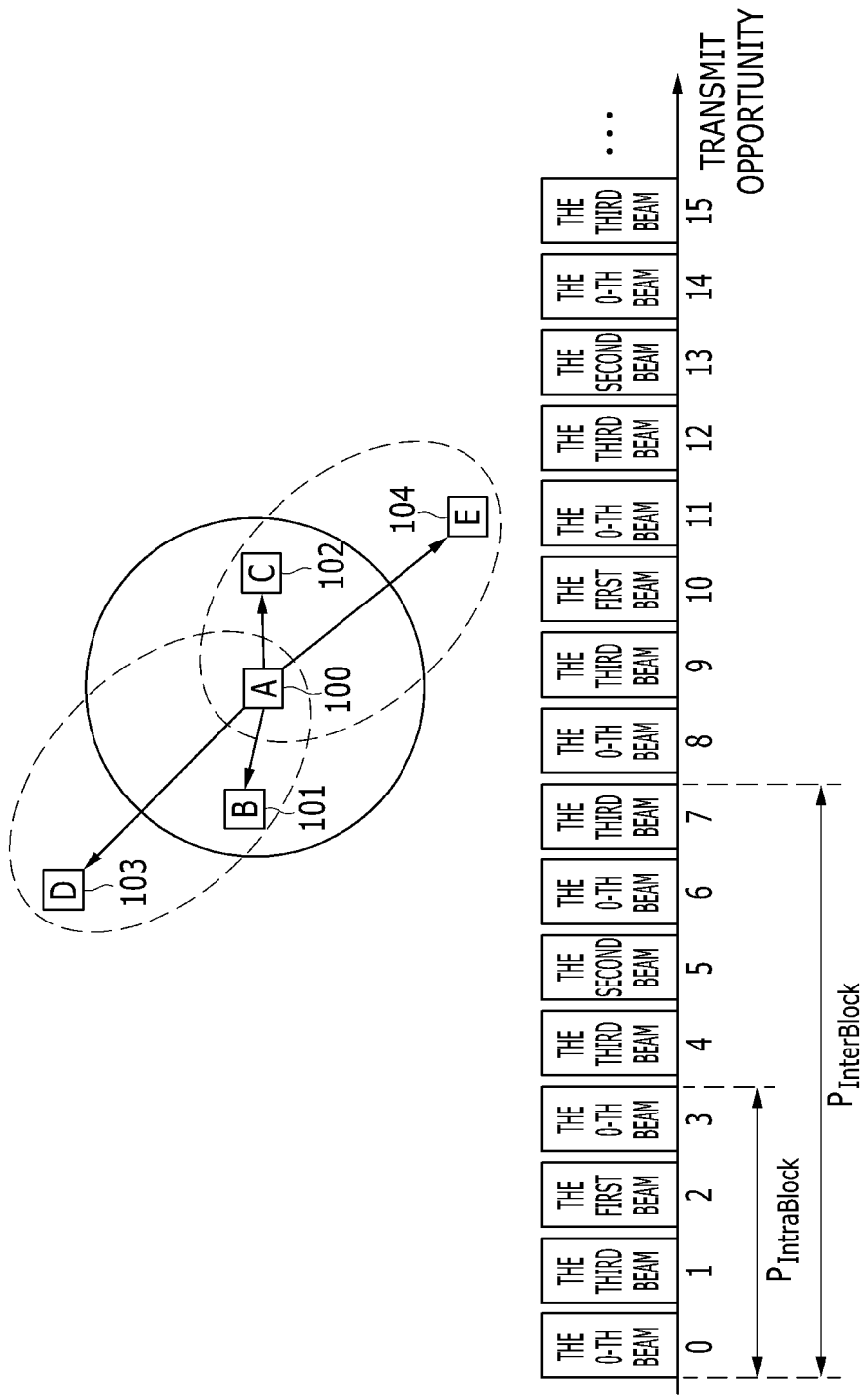

METHOD AND APPARATUS FOR BEAMFORMING IN WIRELESS COMMUNICATION SYSTEM

CROSS-REFERENCE TO RELATED APPLICATION

This application claims priority to and the benefit of Korean Patent Application No. 10-2013-0110677 filed in the Korean Intellectual Property Office on Sep. 13, 2013, the entire contents of which are incorporated herein by reference.

BACKGROUND OF THE INVENTION (a) Field of the Invention

The present invention relates to a beamforming apparatus and method for expanding coverage of a control channel in a wireless communication system.

(b) Description of the Related Art

Communication devices for a variety of wireless communication networks such as cellular networks, mesh networks, and ad hoc networks use control channels which are allocated to transmit (or broadcast) various types of control messages and reference signals. In this case, control messages or the like may be used for link control, access control, or network control in a communication network. Control channels may be allocated in advance or when necessary. In order to form a communication link and network with a neighboring communication device, each communication device needs to successfully receive a reference signal and a control message, which are transmitted from the neighboring communication device over a control channel. Thus, the coverage of the communication link can be limited by the coverage of the control channel.

By employing a beamforming technique on a control message or the like with the use of multiple antennas or sector antennas, the coverage of a control channel can be expanded without increasing transmission power. However, this may result in coverage holes.

To avoid coverage holes, as many control messages as the required number of beams are transmitted to all the communication devices included within coverage, which may result in higher overhead and a lower transmission rate.

SUMMARY OF THE INVENTION

The present invention has been made in an effort to provide a method and apparatus for beamforming, which can expand the coverage of a control channel, reduce overhead, and increase transmission rate by employing a beamforming technique.

An exemplary embodiment of the present invention provides a method for beamforming in a wireless communication device. The beamforming method includes: receiving, from a neighboring communication device, channel state information or beam information associated with the neighboring communication device; determining criteria for beam transmission based on the channel state information or beam information; and transmitting a beam according to the criteria for transmission.

The determining of criteria for transmission may include: determining, for each beam, a set of neighboring communication devices that can receive one of the plurality of beams, if a plurality of beams are generated using the channel state information or beam information; and determining a frequency or period of beam transmission by taking into account the neighboring communication devices included in the set.

The determining of the frequency or period of transmission may include taking into account an amount of control message transmissions each neighboring communication device requires and fairness of beam reception opportunities.

The determining of the frequency or period of transmission may include: determining a plurality of transmission indices based on a number of beams for which the number of elements of a set is the largest and a minimum feedback period of a plurality of beams; and determining whether to transmit a k-th beam or not at an n-th transmit opportunity by the plurality of transmission indices.

The determining of a plurality of transmission indices may include determining a plurality of transmission indices based on a transmission period $P_{InterBlock}$ of a plurality of beams, a transmission period $P_{IntraBlock}$ of each beam, a number $N_{Selected}$ of beams selected from the plurality of beams, and a number $N_{NotSelectedInIntraBlock}$ of beams not selected during the transmission period of each beam.

The receiving of channel state information associated with a neighboring communication device from the neighboring communication device may include: transmitting a reference signal to the neighboring communication device, if the coverage of the reference signal is larger than coverage of a control message; and receiving channel state information about a channel estimated from the reference signal from the neighboring communication device.

The receiving of beam information from a neighboring communication device may include: transmitting the control message to the neighboring communication device, if the coverage of a reference signal is smaller than or equal to coverage of a control message; and receiving beam information, acquired from the control message, from the neighboring communication device that has successfully received the control message.

The transmitting of a control message may include transmitting the reference signal to the neighboring communication device.

Another exemplary embodiment of the present invention provides a beamforming apparatus which transmits a control channel by a beamforming method. The beamforming apparatus includes: a receiver that receives, from a neighboring communication device, channel state information or beam information associated with the neighboring communication device; a controller that determines criteria for beam transmission based on the channel state information or beam information; and a transmitter that transmits a beam according to the criteria for transmission.

The controller may determine, for each beam, a set of neighboring communication devices that can receive one of a plurality of beams, if the plurality of beams are generated using the channel state information or beam information, and determine the frequency or period of beam transmission by taking into account the neighboring communication devices included in the set.

The controller may determine the frequency or period of beam transmission by taking into account an amount of control message transmissions each neighboring communication device requires and fairness of beam reception opportunities.

The controller may determine a plurality of transmission indices based on the number of beams for which a number of elements of a set is largest and a minimum feedback period of a plurality of beams, and determine whether to transmit a k-th beam or not at an n-th transmit opportunity by the plurality of transmission indices.

The controller may determine a plurality of transmission indices based on a transmission period $P_{InterBlock}$ of a plurality of beams, a transmission period $P_{IntraBlock}$ of each beam, a number $N_{Selected}$ of beams selected from the plurality of beams, and a number $N_{NotSelectedInIntraBlock}$ of beams not selected during the transmission period of each beam.

The transmitter may transmit a reference signal to the neighboring communication device, if coverage of the reference signal is larger than coverage of a control message, and the receiver may receive channel state information about a channel estimated from the reference signal from the neighboring communication device.

The transmitter may transmit the control message to the neighboring communication device, if coverage of a reference signal is smaller than or equal to coverage of a control message, and the receiver may receive beam information, acquired from the control message, from a neighboring communication device that has successfully received the control message.

The transmitter may transmit the reference signal to the neighboring communication device.

BRIEF DESCRIPTION OF THE DRAWINGS

FIG. 6 is a view showing beams transmitted to communication devices at every transmit opportunity according to an exemplary embodiment of the present invention.

DETAILED DESCRIPTION OF THE EMBODIMENTS

Figure 1:
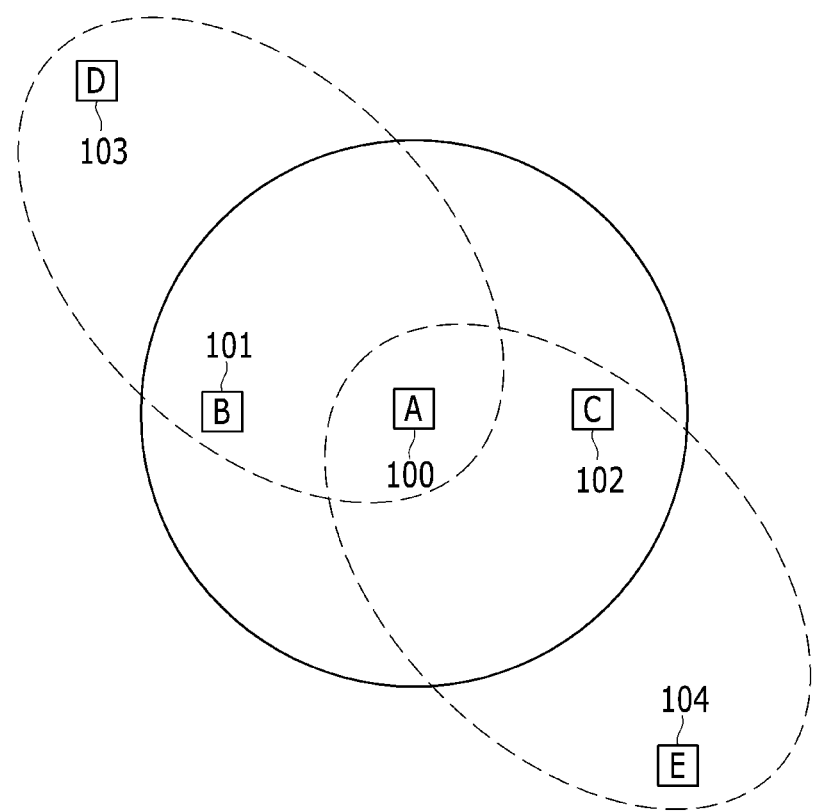
FIG. 1 is a view showing the coverage of control channels of communication devices according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements. In addition, the terms, such as " . . . unit", " . . . er/or", "module", or "block" described in the specification mean units for processing at least one function and operation, and can be implemented by hardware components or software components and combinations thereof.

FIG. 1 is a view showing the coverage of control channels of communication devices according to an exemplary embodiment of the present invention.

Communication device B 101 and communication device C 102, which are adjacent to communication device A 100, may be connected to the communication device A 100 even if beamforming is not used, whereas communication devices D 103 and E 104 cannot be connected to communication device A 100 unless beamforming is used. That is, as long as communication device A 100 can transmit a control channel by using beamforming, communication devices D 103 and E 104 can receive the control channel.

However, a beam that communication device D 103 can receive is different from a beam that communication device E 104 can receive. Therefore, in order for each communication device to transmit a beam, twice as many resources may be needed, as compared to when beamforming is not used.

In the exemplary embodiment of the present invention, channel state information needs to be acquired from a neighboring communication device in order to enable a communication device to use beamforming. The channel state information that the communication device needs to acquire from the neighboring communication deice may include an estimated channel or a beamforming vector (or matrix) calculated from it. Otherwise, if codebook-based channel feedback is used, a codeword index for the estimated channel or optimal beamforming vector may be included in the channel state information.

In order to acquire channel state information from the neighboring communication device, it is necessary to estimate a channel from the neighboring communication device. Thus, each communication device can transmit a reference signal (e.g., preamble, midamble, or pilot) for channel estimation.

Figure 2:
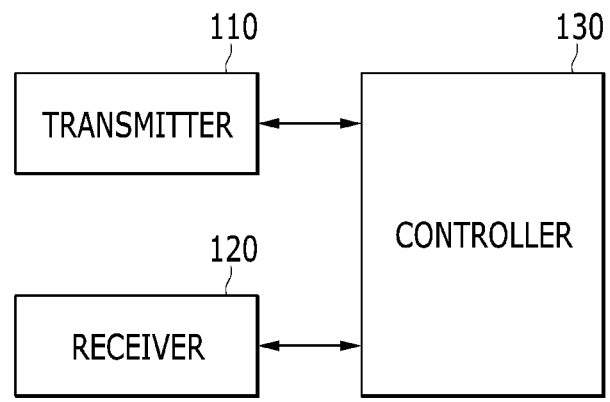
FIG. 2 is a view showing a communication device that performs beamforming according to an exemplary embodiment of the present invention.

FIG. 2 is a view showing a communication device that performs beamforming according to an exemplary embodiment of the present invention.

Referring to FIG. 2, a communication device according to an exemplary embodiment of the present invention includes a transmitter 110, a receiver 120, and a controller 130.

The transmitter 110 can transmit a control channel or data channel and form a beam.

The receiver 120 can receive the control channel and obtain channel state information from a reference signal for the control channel. Otherwise, the receiver 120 may receive the control channel and calculate, from a control message for the control channel, information about the beam used to transmit the control message.

The controller 13 can determine the frequency or period of beam transmission based on the channel state information or beam information acquired from the neighboring communication device. At this time, the controller 130 determines the frequency or period of beam transmission by taking into account the amount of control message transmissions each neighboring communication device requires and the fairness of signal reception opportunities for neighboring communication devices.

A method for a communication device to transmit a control channel by a beamforming method according to an exemplary embodiment of the present invention will be described in detail below with reference to FIGS. 3 to 6.

Figure 3:
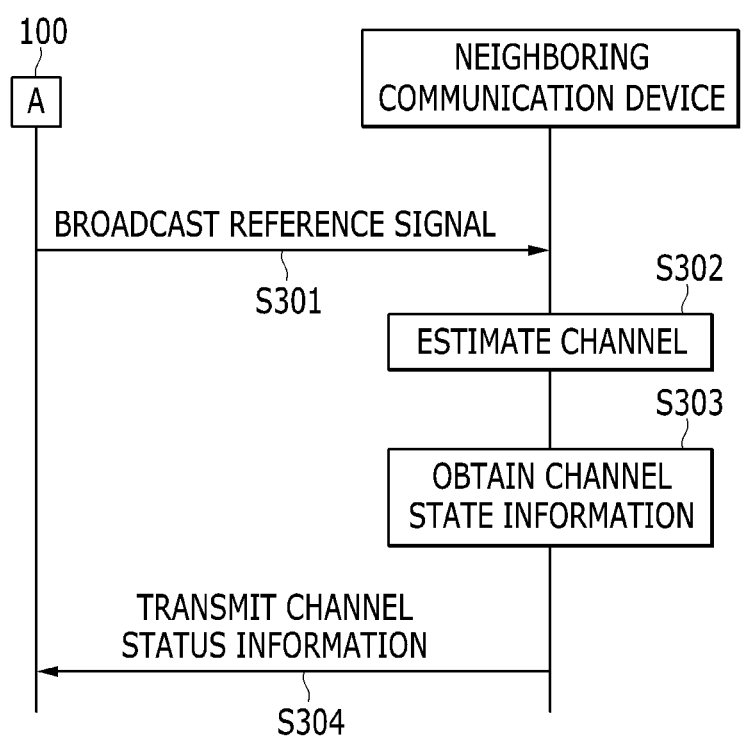
FIG. 3 is a flowchart showing a procedure in which a communication device acquires channel state information according to an exemplary embodiment of the present invention.

FIG. 3 is a flowchart showing a procedure in which a communication device acquires channel state information according to an exemplary embodiment of the present invention.

FIG. 3 shows a procedure in which communication device A 100 acquires channel state information from a neighboring communication device when a beamforming method is used for a control channel based on channel state information acquired from a reference signal.

Communication device A 100 broadcasts a reference signal (S301), and a neighboring communication device estimates a channel from the received reference signal (S302) and then obtains channel state information from the estimated channel (S303).

Thereafter, the neighboring communication device transmits the calculated channel state information to communication device A 100 (S304), so, communication device A 100 can acquire the channel state information associated with the neighboring communication device.

Figure 4:
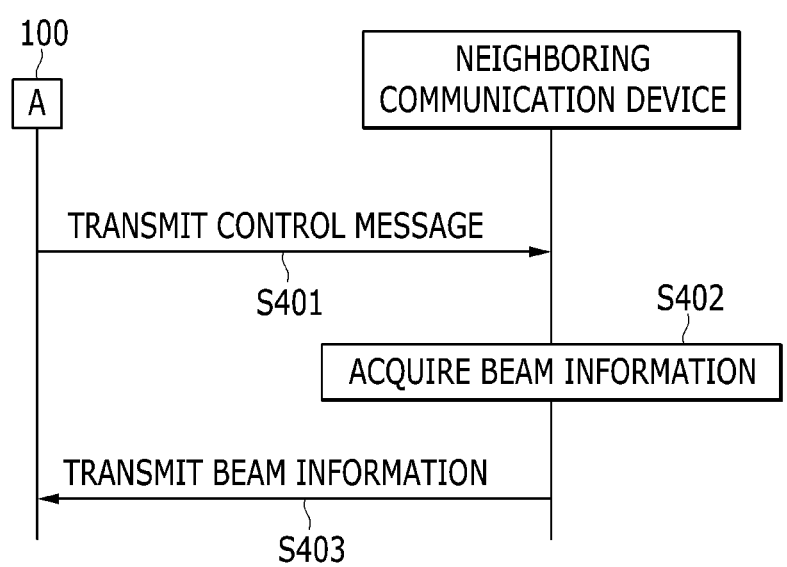
FIG. 4 is a flowchart showing a procedure of acquiring information about a beam that a neighboring communication device can receive according to another exemplary embodiment of the present invention.

FIG. 4 is a flowchart showing a procedure of acquiring information about a beam that a neighboring communication device can receive according to another exemplary embodiment of the present invention.

FIG. 4 shows a procedure in which communication device A 100 acquires information about beams that a neighboring communication device can receive, assuming that information about the beam used to transmit a control message over a control channel is contained in the control message.

Communication device A 100 can form and transmit a certain beam when transmitting a reference signal and a control message, and the control message can contain information about the beam used for the transmission (S401). At this time, the same beam can be used for the reference signal and control message which are transmitted at the same time. The beam information may contain a codeword index for a beamforming vector, a beam index, or a precoding matrix index PMI.

Thereafter, the neighboring communication device is able to acquire the beam information if it has successfully received the control message from communication device A 100 (S402).

Next, the neighboring communication device may transmit the acquired beam information to communication device A 100. In this case, a plurality of beam information acquired for a predetermined period of time may be transmitted at a time (S403).

Through the above-described steps, communication device A 100 is able to get the information about beams that each neighboring communication device can successfully receive. That is, through the above-described steps, communication device A 100 can acquire the information about beams that each neighboring communication device can successfully receive, since it has no channel state information about a channel from each neighboring communication device.

Thereafter, communication device A 100 can determine the frequency of beam transmission based on the received beam information and transmit beams toward each communication device. Accordingly, communication device A 100 can facilitate successful beam reception from a neighboring communication device and prevent coverage holes as it transmits different beams at different timings (transmit opportunities).

Figure 5:
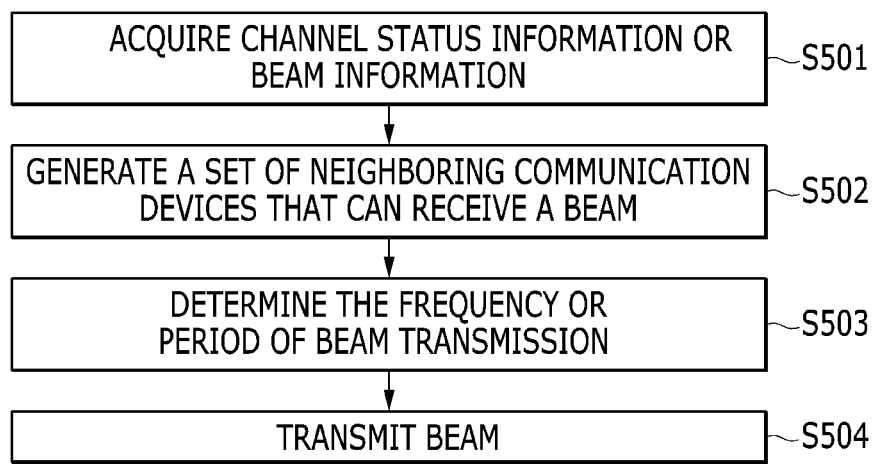
FIG. 5 is a flowchart showing a beamforming procedure for a communication device according to an exemplary embodiment of the present invention.

FIG. 5 is a flowchart showing a beamforming procedure for a communication device according to an exemplary embodiment of the present invention.

Referring to FIG. 5, communication device A 100 generates a set of neighboring communication devices depending on channel state information or beam information acquired (S501) from neighboring communication devices (S502). The set of neighboring communication devices refers to a set of neighboring communication devices that can receive a particular one of a plurality of beams that communication device A 100 generates using channel state information or beam information.

Thereafter, communication device A 100 determines the frequency or period of beam transmission by taking into account the fairness of reception opportunities for neighboring communication devices or the required amount of control message transmissions (S503). In this case, communication device A 100 may determine the fairness of reception opportunities for neighboring communication devices on the basis of a set of neighboring communication devices.

Thereafter, communication device A 100 can transmit a beam when it has an opportunity to transmit a control channel, taking into account the frequency or period of beam transmission allocated for each beam (S504).

In this case, if the coverage of the reference signal is not larger than the coverage of the control message, communication device A 100 can even transmit a beam that the existing neighboring communication devices cannot receive (i.e., a beam for which the cardinality of a set of neighboring communication devices that can receive it is 0), in order to acquire information about beams that new neighboring communication devices can receive or information about beams that the existing neighboring communication devices will change over a channel variation. As communication device A 100 transmits a beam for which the cardinality of a set of neighboring communication devices that can receive it is 0, the neighboring communication devices are able to update receivable beams if a channel variation occurs due to their surrounding terrain features or due to movement, and are also able to acquire information about receivable beams even when they make the first entry into the coverage.

The following is a pseudo code which indicates an algorithm for determining a beam transmission period according to an exemplary embodiment of the present invention.

[pseudo code]

$S_{NbrNode}^* = S_{NbrNode}$
$S_{CB}^* = S_{CB}$
While $|S_{NbrNode}^*| \neq 0$ $k = \underset{i \in S_{CB}^*}{\mathrm{argmax}} \ |M_i|$ $S_{NbrNode}^* = S_{NbrNode}^* \setminus M_k$
$S_{CB}^* = S_{CB}^* \setminus \{k\}$
End
$S_{CB}^{**} = S_{CB} \setminus S_{CB}^*$
$N_{NotSelected} = |S_{CB}^*|$
$N_{Selected} = |S_{CB}^{**}|$ -continued

[pseudo code]

$P_{InterBlock} = N_{Selected} \cdot \lfloor (P_{Min} - N_{NotSelected}) / N_{Selected} \rfloor + N_{NotSelected}$
$N_{IntraBlock} = (P_{InterBlock} - N_{NotSelected}) / N_{Selected}$
$P_{IntraBlock} = \text{round}(N_{NotSelected} / N_{IntraBlock}) + N_{Selected}$
$N_{NotSelectedInIntraBlock} = P_{IntraBlock} - N_{Selected}$ $$I_k(n) = \begin{cases} 1, & \text{if } a(n) < P_{IntraBlock} \cdot N_{IntraBlock} \text{ and } b(n) = J_k^{} \text{ and } k \in S_{CB}^{}, \\ 1, & \text{if } a(n) < P_{IntraBlock} \cdot N_{IntraBlock} \text{ and } c(n) \geq N_{Selected} \text{ and } \\ & d(n) = J_k^* \text{ and } k \in S_{CB}^*, \\ 1, & \text{if } a(n) \geq P_{IntraBlock} \cdot N_{IntraBlock} \text{ and } c(n) + \\ & N_{NotSelectedInIntraBlock} \cdot N_{IntraBlock} = J_k^* \text{ and } k \in S_{CB}^*, \\ 0, & \text{Otherwise} \end{cases}$$

where $I_k(n)$: This indicates that the k-th beam is allocated in the n-th transmit opportunity if it is 1. It is not if it is 0.
$a(n) = \text{mod}(n, P_{InterBlock})$
$b(n) = \text{mod}(\text{mod}(n, P_{InterBlock}), P_{IntraBlock}), N_{Selected})$
$c(n) = \text{mod}(\text{mod}(n, P_{InterBlock}), P_{IntraBlock})$
$d(n) = N_{NotSelectedInIntraBlock} \cdot \lfloor \text{mod}(n, P_{InterBlock}) / P_{IntraBlock} \rfloor + \text{mod}(\text{mod}(n, P_{InterBlock}), P_{IntraBlock}) - N_{Selected}$
n: index of transmit opportunity, $\epsilon \{0,1,2,...\}$
k: beam index, $\epsilon \{0,1,2,...|S_{CB}|-1\}$
|S|: Cardinality of set, S
$J_k^{}$: an order of element, k, in $S_{CB}^{}$
$J_k^*$: an order of element, k, in $S_{CB}^*$
$S_{CB}^{**}$ : an ordered set composed of beam indices
$S_{CB}^*$ : an ordered set composed of beam indices
$M_i$: a set composed of neighbor nodes which can receive the i-th beam
$P_{Max}$: Maximum period within which a beam needs to be transmitted to update beamforming vector/matrix over channel variation where the k-th beam (k$\epsilon$\{0, 1, 2, . . . , |$S_{CB}$|−1\}) is allocated at the n-th transmit opportunity (n$\epsilon$\{0, 1, 2, . . . \}) if $I_k(n)$ is 1, and the k-th beam is not allocated at the n-th transmit opportunity if $I_k(n)$ is 0.

Herein, a(n), b(n), c(n), and d(n), which are used to determine whether $I_k(n)$ is 1 or 0, are values determined between the number of selected or unselected beams and the transmission period of each beam. As used herein, a(n), b(n), c(n), and d(n) will be referred to as transmission indices. The transmission indices, as used herein, may include an index of transmit opportunity, a beam index, and PMI.

a(n) denotes an index of transmit opportunity within the Inter-block for the n-th transmit opportunity, which is a value of the mod function calculated using n and $P_{InterBlock}$. In the exemplary embodiment of the present invention, the coverage of the index of transmit opportunity within the Inter-block ranges from 0 to $P_{InterBlock}$−1. a(n) can be represented by the following Equation 1.

$$a(n) = n - \left\lfloor \frac{n}{P_{InterBlock}} \right\rfloor \times P_{InterBlock} \quad \text{(Equation 1)}$$

Likewise, b(n), c(n), and d(n) can be calculated by the equations shown in the pseudo code by implementing a modulo operation as shown in Equation 1.

b(n) denotes a selected beam index or PMI (belonging to $S_{CB}^{**}$) to be transmitted in the n-th transmit opportunity, which can be obtained by calculating three mod functions using n, $P_{InterBlock}$, $P_{IntraBlock}$, and $N_{selected}$.

c(n) denotes the index of transmit opportunity within the Intra-block for the n-th transmit opportunity, which can be obtained by calculating two mod functions using n, $P_{InterBlock}$, and $P_{IntraBlock}$.

d(n) denotes an unselected beam index or PMI (belonging to $S_{CB}^{**}$) to be transmitted in the n-th transmit opportunity, which can be obtained by calculating a mod function and a floor function using n, $P_{InterBlock}$, $P_{IntraBlock}$, $N_{selected}$, and $N_{NotSelectedIntraBlock}$.

|$S_{CB}$| is the number of elements of the set $S_{CB}$. A\B operator is the set subtraction operator that performs a "minus" of set B from set A. Set $S_{CB}^*$ and set $S_{CB}^{**}$ are ordered sets composed of beam indices or PMIs, $J_k^*$ is an order of element k in set $S_{CB}^*$, and $J_k^{}$ is an order of element k in set $S_{CB}^{}$. $M_i$ is a set composed of neighbor nodes which can receive the i-th beam. $P_{Max}$ is the maximum period within which a beam needs to be transmitted to update a beamforming/precoding vector or beamforming/precoding matrix over a channel variation.

Referring to the above pseudo code, a beamforming vector or beamforming matrix needs to be updated in order to adaptively form a beam over a channel variation, and each beam is transmitted at least once within the transmission period $P_{Max}$ in order to perform update.

In this case, a beam selected to minimize overhead may be repeatedly transmitted every $P_{IntraBlock}$ during the transmission period $P_{max}$, and if the period of a beam pattern corresponds to $P_{InterBlock}$, whether to transmit the k-th beam or not at the n-th transmit opportunity may be determined depending on $I_k(n)$ of the pseudo code.

$N_{selected}$ is the number of PMIs (i.e., beam numbers) selected through the "While" sentence of the above pseudo code. The PMIs selected in the exemplary embodiment of the present invention are 0 and 3, and $N_{selected}$ is 2. $N_{NotSelected}$ is the remaining number of unselected PMIs. The PMIs unselected in the exemplary embodiment of the present invention are 1 and 2, and $N_{NotSelected}$ is 2. $P_{Min}$ is the minimum feedback period of each PMI.

Accordingly, in an exemplary embodiment of the present invention, $P_{InterBlock}$ is 8, $N_{IntraBlock}$ is 3, $P_{IntraBlock}$ is 3, and $N_{NotSelectedinIntraBlock}$ is 1.

FIG. 6 is a view showing beams transmitted to communication devices at every transmit opportunity according to an exemplary embodiment of the present invention.

FIG. 6 illustrates communication device A 100 capable of beamforming using four beams. Communication device B 101 is able to receive the 0-th beam and the first beam, communication device C 102 is able to receive the second beam and the third beam, communication device D 103 is able to receive the 0-th beam, and communication device E 104 is able to receive the third beam.

That is, a set of neighboring communication devices that can receive the 0-th beam includes communication device B 101 and communication device D 103, a set of neighboring communication devices that can receive the first beam includes communication device B 101, a set of neighboring communication devices that can receive the second beam includes communication device C 102, and a set of neighboring communication devices that can receive the third beam includes communication device C 102 and communication device E 104. The 0-th beam and the third beam can each be received by two communication devices, and the first beam and the second beam each can be received by one communication device.

In the exemplary embodiment of the present invention, assuming that communication device A transmits the same amount of control messages to neighboring communication devices, the frequency of transmission of the 0-th beam and the third beam may be n times higher than the frequency of transmission of the first beam and the second beam. According to an exemplary embodiment of the present invention, if a total of eight opportunities to transmit a control channel are defined to update information about receivable beams over a channel variation, the frequency of transmission of the 0-th beam and the third beam may be set three times higher than the frequency of transmission of the first beam and the second beam.

That is, if the eight opportunities to transmit a control channel are simply divided by the number (i.e., 4) of neighboring communication devices for beam transmission, each neighboring communication device can receive a beam only twice. On the other hand, if a set of neighboring communication devices that can receive each beam is managed separately for beam transmission according to an exemplary embodiment of the present invention, each neighboring communication device can receive a beam three times.

Accordingly, according to an exemplary embodiment of the present invention, the overhead of communication device A 100 can decrease (by around two thirds) and the transmission rate can increase (by around three seconds), compared to when the first to fourth beams are transmitted at the same frequency. That is, the 0-th beam and the first beam are transmitted at a high frequency since they can be received by more neighboring communication devices than the first beam and the second beam can, and coverage holes can be prevented.

As seen above, according to the exemplary embodiment of the present invention, neighboring communication devices are classified according to the number of beams that they can receive, and therefore the frequency or period of beam transmission is adjusted to transmit a control channel by a beamforming method. Hence, an overhead reduction and an increase in transmission rate can be achieved, and coverage holes can be prevented.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for beamforming in a wireless communication device, the method comprising:
   receiving, from each of a plurality of neighboring communication devices, channel state information or beam information associated with said each of the plurality of neighboring communication devices;
   determining a criterion for beam transmission based on the received channel state information or beam information, including
      determining a plurality of beams receivable by the plurality of neighboring communication devices using the received channel state information or beam information,
      determining, for each of the plurality of beams, a set of neighboring communication devices that are configured to receive said each beam, and
      determining a transmission frequency for each of the plurality of beams, so that a beam receivable by more neighboring communication devices is transmitted with a higher frequency; and
   transmitting each of the plurality of beams to the neighboring communication devices included in the set according to the determined criterion.

2. The method of claim 1, wherein the determining of the transmission frequency is performed taking into account an amount of control message transmission that each neighboring communication device requires and fairness of beam reception opportunities.

3. The method of claim 1, wherein the determining of the transmission frequency comprises:
   determining a plurality of transmission indices based on a number of elements in each determined set and a minimum feedback period of each of the plurality of beams; and
   determining whether to transmit one of the beams or not at one of a plurality of transmit opportunities by the plurality of transmission indices.

4. The method of claim 1, wherein the receiving of channel state information from each of the neighboring communication devices comprises:
   transmitting a reference signal to said each neighboring communication device, if coverage of the reference signal is larger than coverage of a control message; and
   receiving channel state information about a channel estimated from the reference signal from said each neighboring communication device.

5. The method of claim 1, wherein the receiving of beam information from each neighboring communication device comprises:
   transmitting a control message to said each neighboring communication device, if coverage of a reference signal is smaller than or equal to coverage of the control message; and
   receiving beam information, acquired from the control message, from said each neighboring communication device after receipt of the control message by said each neighboring communication device.

6. The method of claim 5, wherein the transmitting of a control message comprises transmitting the reference signal to said each neighboring communication device.

7. A beamforming apparatus, comprising:
   a receiver configured to receive, from each of a plurality of neighboring communication devices, channel state information or beam information associated with said each of the plurality of neighboring communication devices;
   a controller configured to determine a criterion for beam transmission based on the received channel state information or beam information, by
      determining a plurality of beams receivable by the plurality of neighboring communication devices using the received channel state information or beam information,
      determining, for each of the plurality of beams, a set of neighboring communication devices that are configured to receive said each beam, and
      determining a transmission frequency for each of the plurality of beams, so that a beam receivable by more neighboring communication devices is transmitted with a higher frequency; and
   a transmitter configured to transmit each of the plurality of beams to the neighboring communication devices included in the set according to the determined criterion.

8. The apparatus of claim 7, wherein the controller determines the transmission frequency by taking into account an amount of control message transmissions that each neighboring communication device requires and fairness of beam reception opportunities.

9. The apparatus of claim 7, wherein the controller determines a plurality of transmission indices based on a number of elements in each determined set and a minimum feedback period of each of the plurality of beams, and determines whether to transmit one of the beams or not at one of a plurality of transmit opportunities by the plurality of transmission indices.

10. The apparatus of claim 7, wherein the transmitter transmits a reference signal to each neighboring communication device, if coverage of the reference signal is larger than coverage of a control message, and
   the receiver receives channel state information about a channel estimated from the reference signal from said each neighboring communication device.

11. The apparatus of claim 7, wherein the transmitter transmits a control message to said each neighboring communication device, if coverage of a reference signal is smaller than or equal to coverage of the control message, and
   the receiver receives beam information, acquired from the control message, from a neighboring communication device that has successfully received the control message.

12. The apparatus of claim 11, wherein the transmitter transmits the reference signal to said each neighboring communication device.

13. The method of claim 3, wherein the determining of the plurality of transmission indices comprises:
   selecting a minimum of beams from the plurality of beams based on the number of elements in each determined set and the minimum feedback period of said each of the plurality of beams, so that entire neighboring communication devices are able to receive at least one beam of the selected minimum of beams.

14. The apparatus of claim 9, wherein the controllers is configured to determine the plurality of transmission indices, by
   selecting a minimum of beams from the plurality of beams based on the number of elements in each determined set and the minimum feedback period of said each of the plurality of beams, so that entire neighboring communication devices are able to receive at least one beam of the selected minimum of beams.

15. The apparatus of claim 14, wherein the controller determines the plurality of transmission indices by
   determining a transmission period $P_{InterBlock}$ of the plurality of beams, a transmission period $P_{IntraBlock}$ of the selected minimum of beams, and a number $N_{NotSelectedInIntraBlock}$ of beams excluding any of the selected minimum of beams during the transmission period $P_{IntraBlock}$ based on a number $N_{Selected}$ of the selected minimum of beams and the minimum feedback period of said each of the plurality of beams; and
   determining the plurality of transmission indices based on the transmission period $P_{InterBlock}$, the transmission period $P_{IntraBlock}$, the number $N_{Selected}$, and the number $N_{NotSelectedInIntraBlock}$.

16. The method of claim 13, wherein the determining of the plurality of transmission indices further comprises:
   determining a transmission period $P_{InterBlock}$ of the plurality of beams, a transmission period $P_{IntraBlock}$ of the selected minimum of beams, and a number $N_{NotSelectedInIntraBlock}$ of beams excluding any of the selected minimum of beams during the transmission period $P_{IntraBlock}$ based on a number $N_{Selected}$ of the selected minimum of beams and the minimum feedback period of said each of the plurality of beams; and
   determining the plurality of transmission indices based on the transmission period $P_{InterBlock}$, the transmission period $P_{IntraBlock}$, the number $N_{Selected}$, and the number $N_{NotSelectedInIntraBlock}$.

* * * * *